US008926870B1

(12) United States Patent
Krumhansl et al.

(10) Patent No.: US 8,926,870 B1
(45) Date of Patent: Jan. 6, 2015

(54) MIXED-LAYERED BISMUTH—OXYGEN—IODINE MATERIALS FOR CAPTURE AND WASTE DISPOSAL OF RADIOACTIVE IODINE

(71) Applicant: Sandia Corporation, Albuquerque, NM (US)

(72) Inventors: James L. Krumhansl, Albuquerque, NM (US); Tina M. Nenoff, Sandia Park, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 13/752,600

(22) Filed: Jan. 29, 2013

Related U.S. Application Data

(62) Division of application No. 12/617,051, filed on Nov. 12, 2009, now Pat. No. 8,383,021.

(60) Provisional application No. 61/114,113, filed on Nov. 13, 2008.

(51) Int. Cl.
*H01B 1/00* (2006.01)
*G21F 9/00* (2006.01)

(52) U.S. Cl.
CPC .................................. *G21F 9/008* (2013.01)
USPC ........... 252/517; 252/625; 252/634; 106/479; 210/719

(58) Field of Classification Search
USPC ............. 252/517, 625, 634; 210/719; 106/479
See application file for complete search history.

(56) References Cited

U.S. PATENT DOCUMENTS

| 4,017,417 A | 4/1977 | Clark et al. |
| 4,229,317 A | 10/1980 | Babad et al. |
| 4,252,570 A * | 2/1981 | Shannon ....................... 106/479 |
| 5,352,367 A | 10/1994 | Ochiai et al. |

OTHER PUBLICATIONS

Eggenweiler, et al., "The crystal structure of alpha-Bi5O71", Z. Kristallogr. 216 (2001) 230-233.
Keller, et al., "The crystal structure of B1rO412 and its relation to the structure of Bi4O5Br2", Z. Kristallogr. 217 (2002) 256-264.
Krumhansl, et al., "Durable Materials for GNEP Iodine Waste Streams", American Nuclear Society, 2008 Spring meeting Anaheim, CA Jun. 2008.
Krumhansl, et al., "Novel Bismuth-Based Inorganic Oxide Waste Forms for Iodine Storage,", Proc. Global 2990, Paris, France, Sep. 6-11, 2990 Paper 9ZZZZ.
Nenoff, et al., "Durable Materials for GNEP Iodine Waste Stream", NUCL 2008 Spring ACT meeting, New Orleans, LA, Apr. 2008.

(Continued)

*Primary Examiner* — Khanh Tuan Nguyen
(74) *Attorney, Agent, or Firm* — Daniel J. Jenkins

(57) ABSTRACT

Materials and methods of synthesizing mixed-layered bismuth oxy-iodine materials, which can be synthesized in the presence of aqueous radioactive iodine species found in caustic solutions (e.g. NaOH or KOH). This technology provides a one-step process for both iodine sequestration and storage from nuclear fuel cycles. It results in materials that will be durable for repository conditions much like those found in Waste Isolation Pilot Plant (WIPP) and estimated for Yucca Mountain (YMP). By controlled reactant concentrations, optimized compositions of these mixed-layered bismuth oxy-iodine inorganic materials are produced that have both a high iodine weight percentage and a low solubility in groundwater environments.

19 Claims, 15 Drawing Sheets

(56) References Cited

OTHER PUBLICATIONS

Nenoff, et al., "In-Situ Formation of Bismuth-Based Iodine Waste Forms", Mater. Res. Soc. Symp. Proc. vol. 1043, 1043-T12-05, Dec. 1, 2007.

Nenoff, et al., "Iodine Waste From Summary Report (FY2007)", Sandia National Laboratories, Sandia Report SAND2007-6202, Nov. 27, 2007.

Taylor, et al., "Bismuth Oxylodide: A Candidate Waste Form of Iodine-129", Atomic Energy of Canada Limited, TR-350, Sep. 1985, 375-386.

Taylor, et al., "Some phase relationships between basic bismuth chlorides in aqueous solutions at 25 degrees C", Can. J. Chem. vol. 65, (1987) 2824-2829.

Taylor, et al., "Stability of bismut oxydides in aqueous solutins at 25 degrees C", Can. J. Chem. vol. 64 (1986).

\* cited by examiner

Sample #1

Sample #6

Sample #10

MIXED-LAYERED BISMUTH—OXYGEN—IODINE MATERIALS FOR CAPTURE AND WASTE DISPOSAL OF RADIOACTIVE IODINE

CROSS-REFERENCE TO RELATED APPLICATIONS

This application is a divisional application of U.S. patent application Ser. No. 12/617,051, "Mixed-Layered Bismuth-Oxygen-Iodine Materials For Capture And Waste Disposal of Radioactive Iodine", filed Nov. 13, 2009, which claims the benefit of U.S. Provisional Application No. 61/114,113, "Mixed Bismuth Compounds for Iodine Capture", filed Nov. 13, 2008; which is incorporated by reference herein.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The invention relates generally to methods and materials for disposal of radioactive iodine wastes from nuclear reactor fuel cycles, as well as capture and immobilization of non-radioactive iodine species.

Radioactive $^{129}I$ is one of the longer-lived fission products ($1.6 \times 10^7$ years) resulting from the generation of nuclear energy, and it is also one that is associated with considerable public concern by virtue of the obvious mechanism whereby it may become concentrated in the human body. Historically, $^{129}I$ was simply discharged to the atmosphere. Currently, iodine is discharged to the ocean (principally the seas around Europe) for isotope dilution with the natural iodine in seawater.

With the growth of research on advanced fuel cycles in the United States and abroad, there is a strong interest in the separations and waste form development for all radioisotopes that are isolated in the developing nuclear cycles. This includes the initial trapping of gaseous iodine radioisotopes, and their incorporation into waste forms. Whether wastes are slated for above ground storage, or underground burial, a serious need is that the radionuclides ($^{129}I$, in our case) exist in chemical forms that will not be readily dissolved should water gain access to the site.

A second major consideration is that the wastes not exist as powders, since an accident during storage or handling could produce a cloud of radioactive dust with the potential for causing widespread contamination.

A number of research groups have investigated the complex crystal structures of layered bismuth oxy-iodide compounds. In particular, the researchers focused on the subtle, yet related, differences in the topography of the bismuth oxide layers, and the stacking around the iodine complexes located between the layers (see FIG. 1). Due to the high measured stability limits of bismuth carbonates and iodides with respect to saline groundwater, recent research in Canada has focused on the use of individual bismuth oxyiodide compounds as candidates for radioactive iodine waste forms.

Hence, a need exists for improved methods of synthesizing mixed-layer bismuth oxyiodine and oxy-iodate materials for use in the in-situ recovery of radioactive iodine from caustic waste streams and/or final waste form. In particular, we are focused on the use of these mixed-layer Bi—O—I waste forms if repository conditions are at temperatures at, or below, those under which the iodine was initially captured.

SUMMARY OF THE INVENTION

The invention relates to materials and methods of synthesis of mixed-layered bismuth oxy-iodine materials, in an effort to develop materials for iodine recovery from caustic waste streams (e.g., NaOH or KOH) and/or for final waste disposal; in particular, if repository conditions included ambient temperatures similar to those under which the iodine was initially captured. The results presented involve the in-situ crystallization of layered bismuth oxide compounds with aqueous dissolved iodine (which resides as both iodide ($I^-$) and iodate ($IO_3^-$) forms in solution). Although individual bismuth oxy-iodide compounds (e.g., BiOI) have already been described in the context of capturing radioiodine, our contribution is the unexpected discovery that there are mixed-layered bismuth oxy-iodine materials that optimize both the uptake of iodine and the degree of insolubility (and un-leachability) of iodine in water. These optimized mixed-layered Bi—O—I materials are suitable as a durable waste form for repository conditions such as are predicted at the Yucca Mountain repository (YMP), or in a similar type of repository that could be developed in coordination with iodine production via DOE/Nuclear Energy-Fuel Cycle R&D Program (FCR&D) and Global Nuclear Energy Program (GNEP, currently focused on US-foreign interactions only) production cycles. This technology provides a one-step process for both iodine sequestration and storage for nuclear fuel cycles or non-nuclear industrial processes. By properly controlling reactant concentrations, optimized compositions of the mixed-layered bismuth oxy-iodine materials can be made that have both a high iodine weight percentage and a low solubility in normal groundwater environments.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

The general term "bismuth oxy-iodine compounds" is broadly defined herein to include both the iodide ($I^-$) and iodate ($IO_3^-$) forms of iodine. The term "mixed-layered Bi—O—I materials" and "mixed-layered bismuth oxy-iodine materials" are interchangeable.

Figure 1:
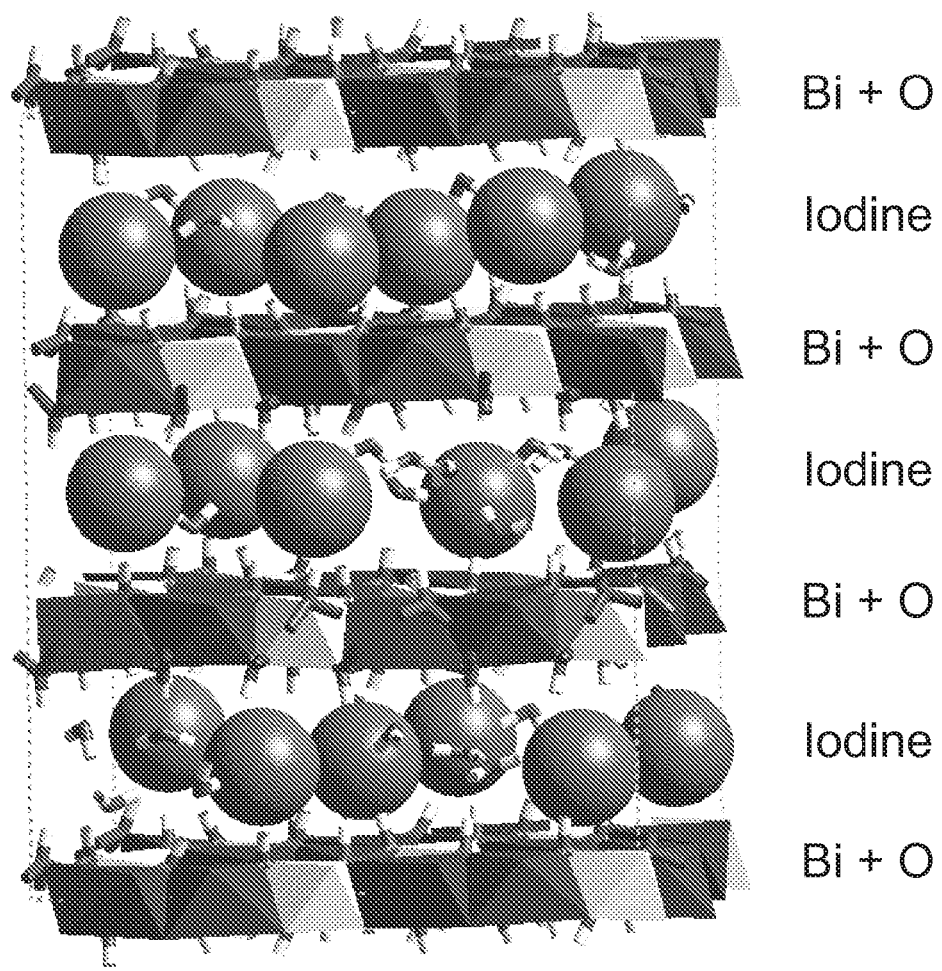
FIG. 1: Layered crystalline structure of Bismuth Oxyiodine (Bi—O—I).

Our novel technology generally involves the in-situ crystallization of layered bismuth oxide compounds (See FIG. 1) with aqueous dissolved iodine (which resides as both iodide and iodate in solution). Although individual bismuth oxy-iodide compounds (e.g., BiOI) have already been described in the context of capturing radioiodine, our unique contribution is the unexpected discovery that there are mixed-layered Bi—O—I materials, not described in the prior work, which optimize both the uptake of iodine and the degree of insolubility (and un-leachability) of iodine. When optimized, these mixed-layered Bi—O—I materials are durable materials that are especially suitable as a waste forms for repository conditions, such as are predicted at the Yucca Mountain repository (YMP) or in a similar type of repository that could be developed in coordination with iodine production via advanced nuclear fuel production cycles (or other fuel storage and reprocessing technologies).

In this work, we identified two (known) layered bismuth oxy-iodide lattice types (lattice phases), i.e., BiOI and $Bi_5O_7I$, as primary building blocks in our synthesized mixed-layered Bi—O—I materials. The proportions (relative to each other) of the known lattice phases, BiOI and $Bi_5O_7I$, (and possibly additional, unknown Bi—O—I lattice phases) was optimized by to produce a series of intimately mixed layered Bi—O—I materials that have both high iodine uptake in aqueous solutions, and minimal leachability of the iodine component. Leachability concerns in predicted repository conditions include temperatures below 100° C., and in contact with groundwater (aqueous environment) containing competing ions of chloride and carbonate.

The meaning of our term "mixed-layered Bi—O—I materials" is different than a simple mechanical mixture (i.e., combination) of individual BiOI or $Bi_5O_7I$ particles. Instead, the term "mixed-layered Bi—O—I materials" means a "chemical assemblage at an atomistic or molecular scale of at least two different Bi—O—I lattice types or lattice phases." The "at least two different Bi—O—I lattice types or lattice phases" could be BiOI, or $Bi_5O_7I$, or they could be other Bi—O—I lattice phases that haven't yet been identified.

The optimized mixed-layered Bi—O—I materials that we made were synthesized under the general mild precipitation method of adding a mixture of $Bi(NO_3)_3+HNO_3+KI$ (or $KIO_3$) into a basic solution (e.g., with NaOH or KOH). The resultant precipitates were aged at elevated temperature (e.g., 70-90° C. for 24 hours, and they ranged in color from yellow to orange depending on composition ranges. The heated solution begins at mild basic pH (approximately >7), and then falls with time to become acidic (pH≈3-4). The solid settles and the solution is decanted off. The solids were repeatedly washed/soaked with DI water until the ionic strength drops and the solids remain in suspension. At this point, the wet slurry was dried at 90° C. for 12 hours, or until completely dry.

The methodology we developed for this discovery used a series of varying bismuth-to-iodine ratios in the different mixes that were progressively increased in 10% increments. Ideally, the sample with the greatest content of iodine should have had a Bi:I molar ratio of 1:1, conducive to forming the compound BiOI, if all of the iodine had reacted with the bismuth. In reality, complete uptake of iodine stopped in the mixture of lattice phases in the series at sample #7, and synthesis of pure BiOI was never achieved.

Unexpectedly, we discovered that the optimum composition of the mixed-layered Bi—O—I materials fell in the middle of the "1-10" series, (i.e., samples 4, 5, 6), rather than at either end of the spectrum. These three optimized materials incorporated 17-22 wt % iodine into their structures. The relative representations of $Bi_5O_7I$ and BiOI lattices in the optimized materials were determined by X-Ray Diffraction, XRD, and the elemental compositions were established by X-Ray Fluorescence (XRF).

In the optimized materials (samples 4, 5, 6) the relative contributions of the two known bismuth oxyiodide lattice phases were calculated to be: 15-20 mole % $Bi_5O_7I$ and 85-80 mole % BiOI. Also, the three samples, which had the highest amount of incorporated iodine, also had the lowest solubility of all the materials' combinations when exposed to chloride, sulfate, and carbonate-containing solutions (simulants for possible groundwater contaminants).

This last result is quite surprising, because according to Taylor and Lopata, in "Stability of Bismuth Oxyiodides in Aqueous Solutions at 25° C.", CAN. J. CHEM. Vol. 64, 1986, pp. 290-294, they found: "From the viewpoint of radioactive iodine immobilization, the most important conclusion is that $Bi_5O_7I$ is seven orders of magnitude more stable than BiOI towards hydrolysis." However, in our synthesized optimum materials, the highest stability (lowest iodine solubility) was achieved with a very different proportion, i.e., 15-20 mole % $Bi_5O_7I$ and 85-80 mole % of BiOI (opposite from what Taylor would have predicted from their work).

Method of Synthesis

All chemicals were used as received without further purification from Fisher Scientific—Certified. In house analytical testing used for characterizing the composition and solubility of the iodine loaded on inorganic bismuth waste forms include: (1) Orion specific ion electrode, (2) PerkinElmer Elan 6100 ICP-MS (3) X-ray fluorescence ARL (Thermo) QUANT'X EDXRF Analyzer, (4) TA Instruments STD Q666 Simultaneous DTA-TGA, (5) Powder X-ray (XRD) Bruker AXS-D8 Advance powder diffractometer.

Leaching studies were carried out by a generalized deionized water solubility test (similar to the modified Product Consistency Test Procedure B (PCT test, American Society for Testing and Materials Standards. Standard Test Method for Determining Chemical Durability of Nuclear, Hazardous, and Mixed Waste and Glasses. The Product Consistency Test (PCT), 2008 Annual Book of ASTM Standards. American Society for Testing and Materials Standards, West Conshohocken, Pa., 2008.) method in which powders of the resultant bismuth oxyiodide mixtures were leached in deionized water. A 10 wt % (10 g water/1 g solid) solution of the bismuth powdery material is suspended in DI $H_2O$, and heated at 90° C. for 24 hours in a screw top Teflon container. The resultant liquid was analyzed by ICP-MS (or specific iodine electrode)

for leached iodine, and the pH was measured on the cooled solution using a standard pH electrode.

Three series of samples (i.e., the "41" series, the "42" series, and the "1-10" series) were prepared by dissolving bismuth nitrate (e.g., as $Bi(NO_3)_3.5H_2O$) and potassium iodide, mixing them in various ways, and then causing a precipitate to form by occasionally adding a basic solution made with sodium hydroxide (or with any alkali or alkaline earth oxide or hydroxide). Other bismuth salts can be used in place of bismuth nitrate (e.g., bismuth trichloride). Specific details of preparation are given below:

"41 Series" Samples

Appropriate amounts of solid bismuth nitrate and potassium iodide (KI) salts were added dry to a bottle. Samples 41A and 41B had Bi-to-I ratios appropriate to making $Bi_5O_7I$ (Bi:I=5); 41C and 41D appropriate to making $Bi_7O_9I_3$ (Bi:I=2.33); and 41E and 41F appropriate to making $Bi_4O_5I_2$ (Bi:I=2.00). Then, DI water (~50 ml) was added and the mixes put on a shaker at room temperature for about an hour. Finally, alternately in every other sample, an aliquot (~22 ml) of 1 M NaOH (samples 41 B, D, F), or an approximately equal amount of deionized water (samples 41 A, C, E), was added. The mixes were then set back on the shaker overnight. The next afternoon they went into the oven (along with the "42 Series" mixes) to age over the weekend at 90° C. After three days, the samples were cooled to room temperature, the supernate was decanted off, and the heated solids were rinsed repeatedly with deionized water. At the end of the process the supernates from 41B, 41D and 41F were still strongly basic (blue pH paper), while 41A, 41C and 41E were quite acid (red pH paper). Table 1 summarizes the composition and XRD results.

and hydrolyzed. Finally, the appropriate amounts of KI were added as a solid salt, and the bottles returned to the shaker for about two hours. Samples were then placed in the 90° C. oven over the weekend. The following Monday, the samples were cooled to room temperature, the supernate was decanted off, and the heated solids were rinsed repeatedly with deionized water. At the end of the process the supernates from 42B, 42D and 42F were still strongly basic (blue pH paper), while 42A, 42C and 42E were quite acid (red pH paper). See results in Table 1.

"1-10 Series" Samples

The "1-10" series samples were prepared as follows. In this instance, rather than trying to mix Bi and I in specific proportions chosen to mimic known bismuth oxyiodine compounds, the Bi to I ratio was stepped up progressively in small (i.e., 10%) increments. As shown in Recipe #1, these samples were prepared by dissolving bismuth nitrate and potassium iodide in deionized water, and then bringing the pH to near 7 by adding sodium hydroxide (and occasionally back titrating with a little acetic acid when adding the standard aliquot of NaOH resulted in a pH significantly above 7). Samples were then incubated in the 90° C. oven overnight. The bismuth to iodine ratios in the different mixes (samples 1-10) were increased by 10% increments, so that the sample with the greatest content of iodine would have had a Bi:I molar ratio of 1.4 (conducive to forming the compound $Bi_7O_8I_5$), if all of the iodine had reacted with the bismuth. However, analysis of the post-synthesis fluids indicated, however, that complete uptake of iodine stopped with the $7^{th}$ sample in the "1-10" series, so that the synthesis of $Bi_7O_8I_5$ was not actually achieved in samples #8, 9, or 10. The results are shown in Table 2.

TABLE 1

Composition and Characteristics of Series "41" and "42" Samples:

| | Chemical Analysis | | | | Prep: | | 25-35 |
|---|---|---|---|---|---|---|---|
| | by XRF I/Bi molar | by XRF Bi/I molar | by Design Bi:I | Intensity | Color | NaOH Added ? | ~8.6 A Peak | deg. 2-Theta Peaks |
| 41A | 0.006 | 159 | 5 | light | brown | no | major | 5, 1 major |
| 41B | 0.214 | 4.68 | 5 | medium | orange | yes | trace | 6, 3 major |
| 41C | 0.011 | 91 | 2.33 | dark | orange | no | major | 4, 1 major |
| 41D | 0.433 | 2.31 | 2.33 | dark | orange | yes | trace, shifted | 3 major |
| 41E | 0.007 | 140 | 2 | light | brown | no | small | 4, 3 major |
| 41F | 0.520 | 1.92 | 2 | dark | orange | yes | trace, shifted | 6, 5 major |
| 42A | 0.009 | 114 | 5 | medium | brown | no | major | 5, 3 major |
| 42B | 0.213 | 4.69 | 5 | light | yellow | yes | none | 5, 3 major |
| 42C | 0.015 | 68 | 2.33 | dark | brown | no | major | 5, 3 major |
| 42D | 0.405 | 2.47 | 2.33 | light | orange | yes | none | 5, 1 major |
| 42E | 0.024 | 42 | 2 | dark | brown | no | major | 5, 1 major |
| 42F | 0.521 | 1.92 | 2 | light | orange | yes | none | 2 major |

"42 Series" Samples

Mixes 42 A-F were designed to have the same Bi:I ratios as in the "41 Series", but the order in which the constituents were mixed was different. First, the appropriate amounts of bismuth nitrate salts were placed in the bottles, and then an aliquot (~22 ml) of either 1 M NaOH (samples 42 B, D, F) or deionized water (samples 42 A, C, E) was added. Then, 50 ml of deionized water was added to each bottle, and the mixes put on a (room temperature) shaker for 15 minutes. Generally, a white, milky slurry formed as the bismuth nitrate dissolved

Recipe for Making Samples "1-10"

1. Label sample bottles #1 through 10;
2. Add 4 g (+/−0.1 g) of Bismuth Nitrate, $Bi(NO_3)_3.5H_2O$, into each of the ten bottles;
3. Add 50 ml of deionized water to each bottle;
4. Put them on a shaker for 20-40 minutes;
5. Add X grams of potassium iodide (KI) individually to the appropriate bottle, according to the following:

| Sample No. | X grams of KI |
|---|---|
| 1 | 0.137 |
| 2 | 0.274 |
| 3 | 0.411 |
| 4 | 0.548 |
| 5 | 0.684 |
| 6 | 0.821 |
| 7 | 0.958 |
| 8 | 1.095 |
| 9 | 1.232 |
| 10 | 1.369 |

6. Shake, record the color produced, then shake for 30 minutes, record color;
7. Add 20 ml of 1 M NaOH to each bottle, shake for 1 hour or overnight, and record color;
8. Place in oven and heat at 90° C. for overnight or over the weekend;
9. Cool the bottles to room temperature, decant the supernate off (save the supernate); and
10. Rinse the remaining precipitated solids repeatedly with deionized water and dry.

TABLE 2

Composition and Characteristics of the "1-10" Series Samples

|   | wt % Bi | wt % I | molar I:Bi | molar Bi:I | moles O | wt % I | % I in the supernate | pH after heating |
|---|---|---|---|---|---|---|---|---|
| 1 | 79.40 | 4.62 | 0.11 | 8.79 | 1.44 | 4.98 | 0.41% | 2.1 |
| 2 | 72.22 | 6.45 | 0.17 | 5.73 | 1.41 | 7.45 | 0.31% | 2.3 |
| 3 | 77.99 | 14.21 | 0.36 | 2.81 | 1.32 | 14.19 | 0.32% | 2.3 |
| 4 | 74.80 | 17.99 | 0.47 | 2.13 | 1.26 | 17.98 | 0.30% | 4.7 |
| 5 | 69.90 | 21.80 | 0.61 | 1.64 | 1.20 | 22.22 | 0.27% | 5.2 |
| 6 | 57.37 | 17.70 | 0.60 | 1.66 | 1.20 | 22.03 | 0.29% | 6.5 |
| 7 | 67.72 | 28.10 | 0.81 | 1.23 | 1.09 | 27.69 | 0.27% | 6.8 |
| 8 | 61.33 | 24.33 | 0.78 | 1.29 | 1.11 | 26.77 | 12.86% | 6.9 |
| 9 | 63.77 | 27.38 | 0.84 | 1.19 | 1.08 | 28.40 | 15.55% | 6.8 |
| 10 | 66.16 | 25.87 | 0.76 | 1.31 | 1.12 | 26.48 | 26.50% | 6.7 |

The rational for carrying out the "1-10 Series" synthesis experiments was to approach the matter of synthesis in a more controlled manner. Toward this end, more system variables were assessed; as well as having the Bi:I proportions in the starting mixes incremented in smaller steps. After synthesis, two parameters were measured on the remaining supernate: the pH and the residual iodine left in the solution from which the solids had precipitated (See Table 2). Although the pH of the synthesis fluid was nearly neutral in all samples prior to the final incubation at 90° C., the heating process resulted in further reactions in samples 1-3, which lowered the pH. A post-test iodide analysis of the supernate in samples #1-7 revealed that effectively all of the iodine added in the initial mix was taken up by the solid precipitates.

Figure 2:
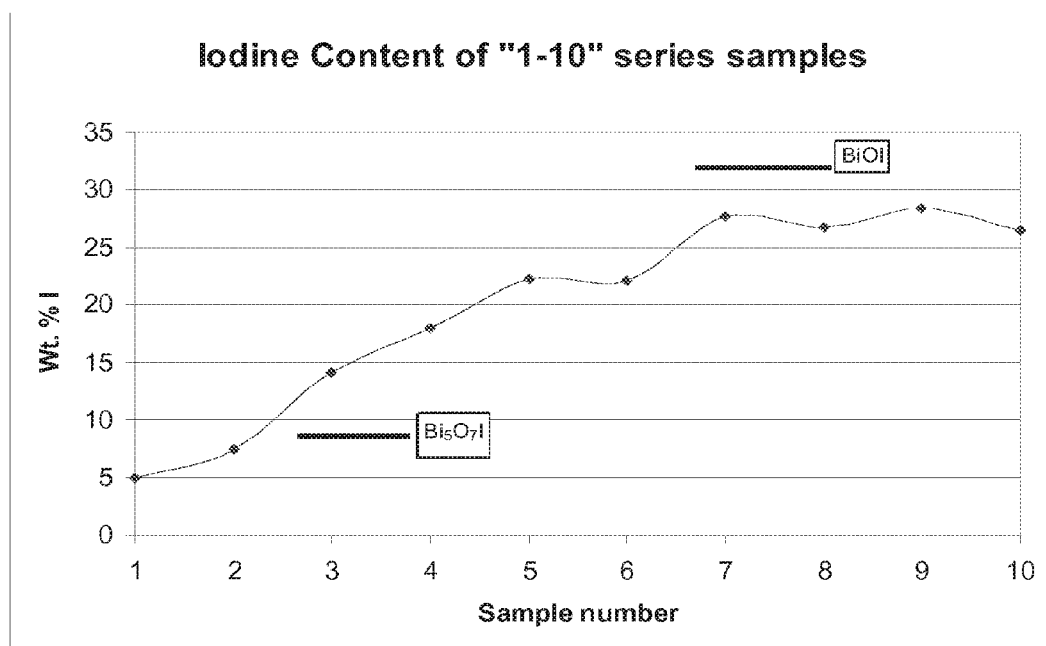
FIG. 2: Iodine content of "1-10" series samples. Solid horizontal bars show theoretical iodine contents of two reference materials tentatively identified by X-ray diffraction.

In contrast, for samples 8-10, an analysis of the post-heating supernate suggests that not all of the iodine provided in the synthesis ended up on the solids. This picture was confirmed by the XRF analysis of the solids (FIG. 2), which showed that after sample 7 (i.e., in samples 8, 9, 10) the iodine content of the solids no longer increased, in spite of the fact that additional iodine was provided by the synthesis recipe. The actual weight percent of iodine in the samples, of course, depends on all of the components in the compound (i.e., Bi, O, I, plus any contaminants). In this case the amount of oxygen assumed to be present was computed based on what would be needed to maintain charge balance in a compound containing only oxygen, iodine (as iodide), and bismuth.

Earlier FTIR studies on similar compounds had confirmed that neither hydroxide nor carbonate (as a contaminant in the NaOH used in the preparation) were present in significant amounts. Also, the XRF (SEM-EDS) studies confirmed that neither Na nor K (from the base used to precipitate the compounds) was incorporated to a significant degree in the solid precipitates. So, this is a reasonable assumption.

X-Ray Diffraction (XRD) Studies on Bismuth Oxyiodine Materials

Figure 3:
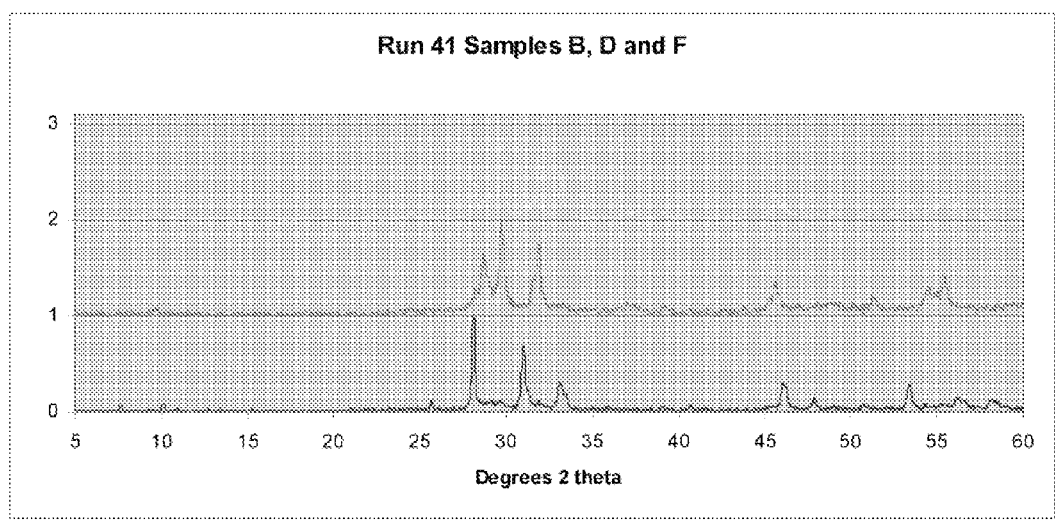
FIG. 3: X-ray diffraction patterns for series 42 samples: B (bottom), D middle), F (top).
Figure 4:
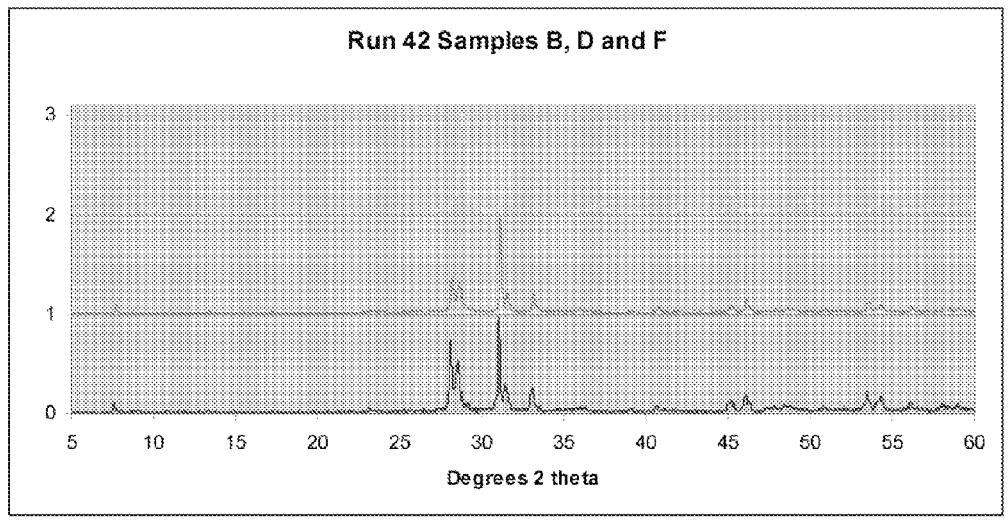
FIG. 4: X-ray diffraction patterns for series 41 samples: B (bottom), D (middle), F (top).
Figure 5:
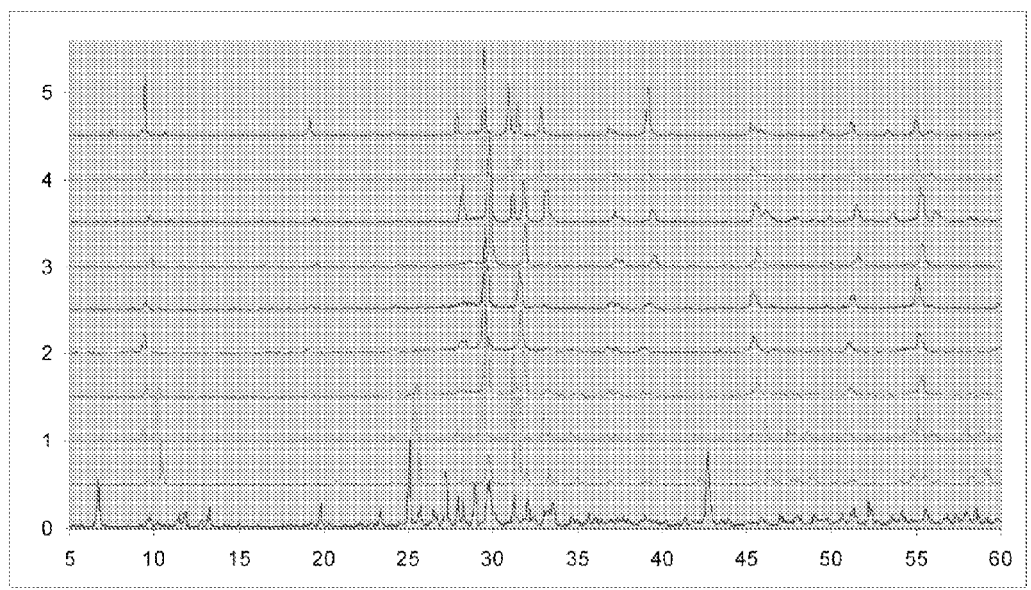
FIG. 5: Series "1-10" X-ray diffraction patterns" series arranged in ascending sample number order: the compound with the most iodide initially present in the synthesis (#10, top) is at the top of the stack and the mix with the smallest initial iodide content is at the bottom (#1, bottom).

Powder X-ray diffraction patterns (XRD) were obtained for all of the materials described above. Many of the patterns exhibit similar features, although in detail there are significant differences, which have entailed some effort to resolve. FIGS. 3 and 4 provide diffraction data on the three "41" and "42" samples (respectively) which exhibited significant uptake of iodine (e.g., B, D, and F). FIG. 5 provides a full display of all ten traces from the "1-10" series materials. These traces ultimately provided the basis for characterizing the materials that were the most stable, and contained the highest proportions of iodine (and hence make the most attractive targets for potential waste form development).

Solubility Studies on Bismuth Oxyiodine Materials

The solubility of our novel mixed-layered bismuth oxyiodine materials can be approached from two directions; solubility in pure deionized water using a PCT-type test protocol, and the solubility in normal groundwaters (e.g., with $Na^+$, $K^+$, $Ca^{2+}$, $Mg^{2+}$, $Cl^-$, $HCO_3^-$, $SO_4^{2-}$). Fortunately, basic thermodynamic data is available for both BiOI and $Bi_5O_7I$. Calculations involving these data indicate that both $HCO_3^-$ and $Cl^-$ will quantitatively displace iodide from the waste, even if only present at concentrations of just a few tens of parts per million. Thermodynamic data for the sulfate solubility is not available. Thus, to model the performance of a repository, one can simply equate the outward iodide flux to the incoming flux of chloride plus bicarbonate (and maybe sulfate), provided that the basic solubility of the waste form is significantly less than the indigenous concentrations of the common groundwater anions.

Figure 6:
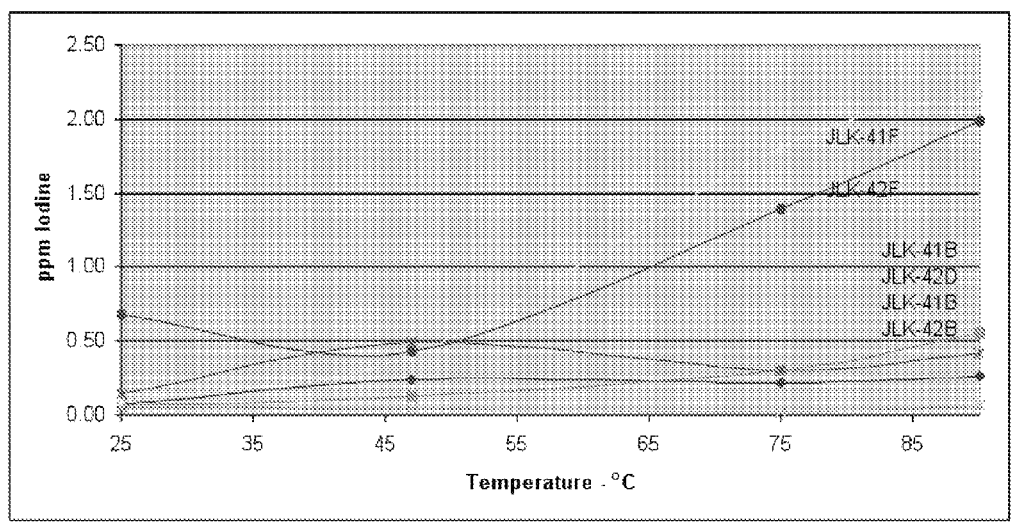
FIG. 6: Solubility of "41-42" series materials in deionized water.
Figure 7:
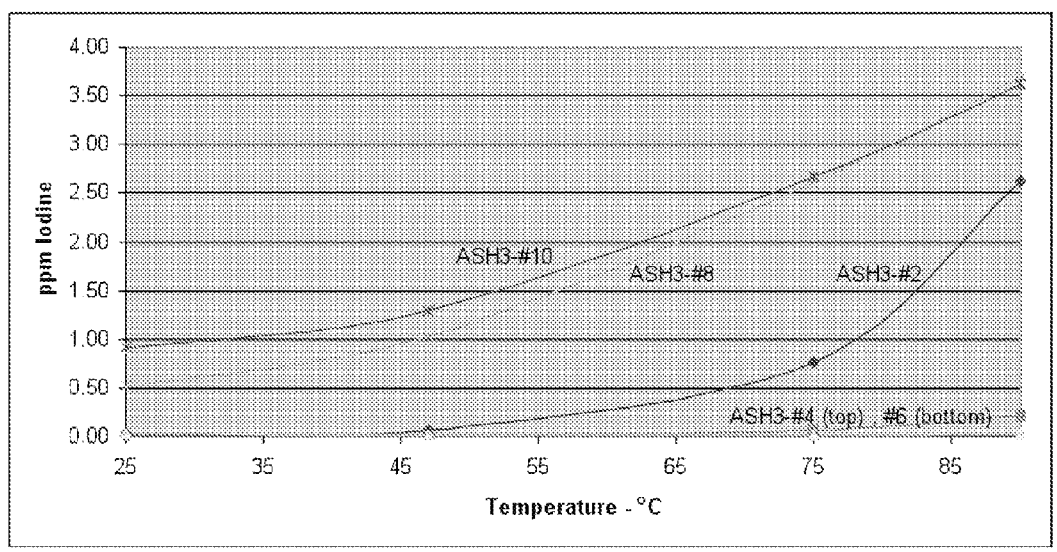
FIG. 7: Solubility of select "1-10" series materials in deionized water.

In our leaching tests, the level of iodine leached from the various materials is a few parts per million. FIG. 7 clearly demonstrates that there is a significant difference in the overall stability of the different materials, with the materials giving relatively well-defined patterns for BiOI holding a distinct advantage (e.g. lower solubility and, hence, greater stability) over materials at either end of the compositional spectrum. In a general sense, this picture is also supported by the series "41-42" samples (FIG. 6), though, since these experiments did not explore the low-iodine end of the spectrum curves analogous to ASH3-#2 in FIG. 7. Tables 3-5 summarize the solubility test data. (Note: The sample designated "ASH3-#2"

is the same as sample 2; "ASH3-#4" is the same as sample 4, "JLK-41B" is the same as sample 41B, etc.)

It is noteworthy that these solubility results are quite different from predictions based on thermochemical properties of $BiOI_3$ and $Bi_5O_7I$; and that this distinction serves to emphasize the difference between our mixed-layered Bi—O—I materials and the two end-member compositions (BiOI and $Bi_5O_7I$); or simple mechanical mixtures thereof.

TABLE 3

Solubility (ppm iodine) of bismuth oxyiodine materials in deionized water.

| Temp - °C. | ASH3-#2 | ASH3-#4 | ASH3-#6 | ASH3-#8 |
|---|---|---|---|---|
| 25 | 0.03 | 0.01 | 0.04 | 0.52 |
| 47 | 0.07 | 0.01 | 0.01 | 1.03 |
| 75 | 0.76 | 0.07 | 0.01 | 2.61 |
| 90 | 2.62 | 0.21 | 0.04 | 3.69 |
| Temp - °C. | ASH3-#10 | JLK-41B | JLK-41D | JLK-41F |
| 25 | 0.91 | 0.08 | 0.06 | 0.10 |
| 47 | 1.30 | 0.24 | 0.12 | 0.41 |
| 75 | 2.67 | 0.22 | 0.31 | 1.81 |
| 90 | 3.62 | 0.27 | 0.55 | 2.19 |
| Temp - °C. | JLK-42B | JLK-42D | JLK-42F | |
| 25 | 0.05 | 0.14 | 0.68 | |
| 47 | 0.04 | 0.49 | 0.43 | |
| 75 | 0.02 | 0.30 | 1.39 | |
| 90 | 0.06 | 0.42 | 1.99 | |

TABLE 4

Post-test quench pH values of solubility experiment fluids after sitting for 2-3 weeks at RT.

| Temp - °C. | ASH3-#2 | ASH3-#4 | ASH3-#6 | ASH3-#8 |
|---|---|---|---|---|
| 25 | 3.10 | 3.46 | 3.7 | 4.54 |
| 47 | 2.98 | 3.52 | 3.60 | 4.54 |
| 75 | 3.70 | 3.35 | 3.61 | 4.20 |
| 90 | 3.08 | 3.15 | 3.56 | 4.04 |
| Temp - °C. | ASH3-#10 | JLK-41B | JLK-41D | JLK-41F |
| 25 | 4.45 | 4.19 | 3.81 | 4.29 |
| 47 | 4.55 | 3.92 | 3.76 | 4.18 |
| 75 | 4.17 | 3.73 | 3.65 | 3.91 |
| 90 | 4.05 | 3.66 | 3.64 | no spl. left |
| Temp - °C. | JLK-42B | JLK-42D | JLK-42F | |
| 25 | 3.92 | 3.72 | 3.98 | |
| 47 | 3.88 | 3.66 | 3.82 | |
| 75 | 3.68 | 3.36 | 3.69 | |
| 90 | 3.71 | 3.44 | 3.67 | |

TABLE 5

Solubility (ppb iodine) of "1-10" series materials in deionized water.

| Temp °C. | #2 | #4 | #6 | #8 | #10 |
|---|---|---|---|---|---|
| 25 | 10.20 | 4.69 | 11.70 | 178.47 | 333.62 |
| 47 | 23.62 | 4.93 | 3.71 | 388.52 | 385.30 |
| 77 | 260.46 | 21.45 | 2.61 | 930.37 | 576.88 |
| 94 | 856.81 (ppb) iodine | 77.62 | 12.67 | 1110.02 | 1191.63 |

Figure 8:
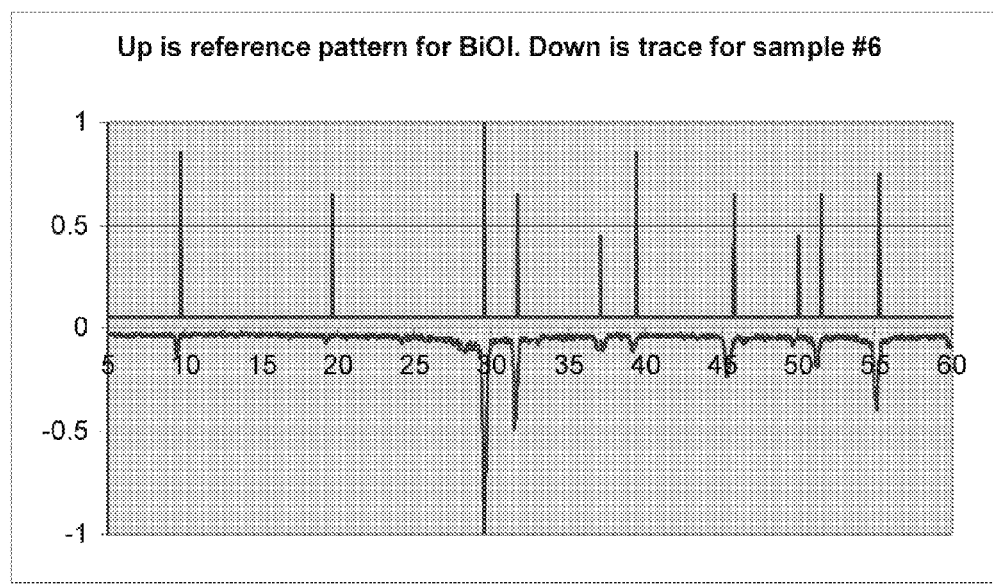
FIG. 8: XRD match between the reference pattern for BiOI and pattern #6.
Figure 9:
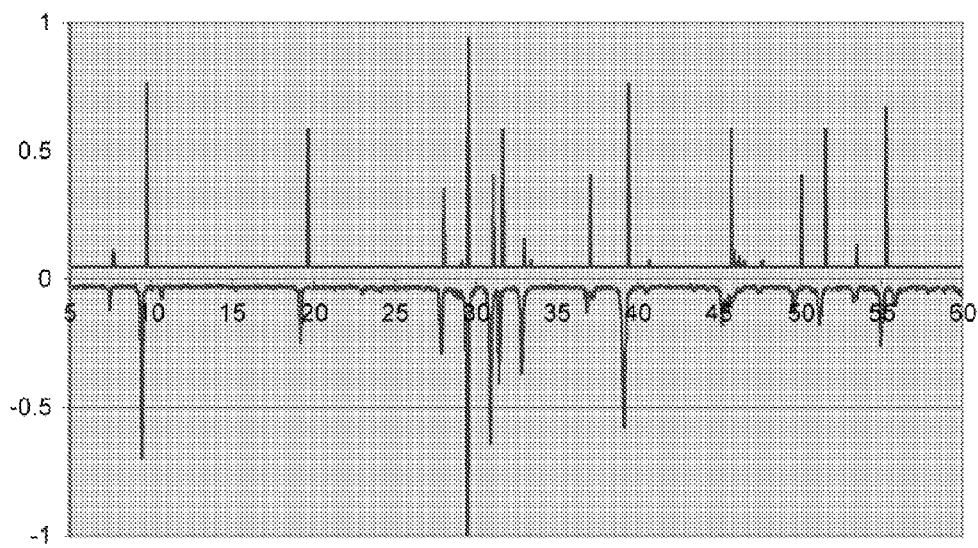
FIG. 9: Match between Sample #10 trace and a composite reference pattern of five parts BiOI plus two parts $Bi_5O_7I$. Reference pattern points up, actual trace for #10 points down.

In summary, we unexpectedly discovered a set of closely-related mixed-layered Bi—O—I materials (samples #4-6, Table 2), containing 17-22 weight % iodine, and having X-ray diffraction patterns related to BiOI, (see FIG. 8), which leaches out significantly less iodine than materials synthesized with either more, or less, iodine (relative to the amounts of Bi in the mix). In terms of sample identification, we calculated, for example, that the sample #10 X-ray diffraction pattern could be best matched by assuming a scaled mix of 2 "parts" of the $Bi_5O_7I$ XRD pattern and 5 "parts" of the BiOI XRD pattern (See FIG. 9). For the optimized materials (samples 4, 5, 6), the relative contributions to the total XRD pattern from the XRD patterns of the two known bismuth oxyiodide lattice phases was calculated to be: 15-20 mole % $Bi_5O_7I$ and 85-80 mole % BiOI.

Figure 10:
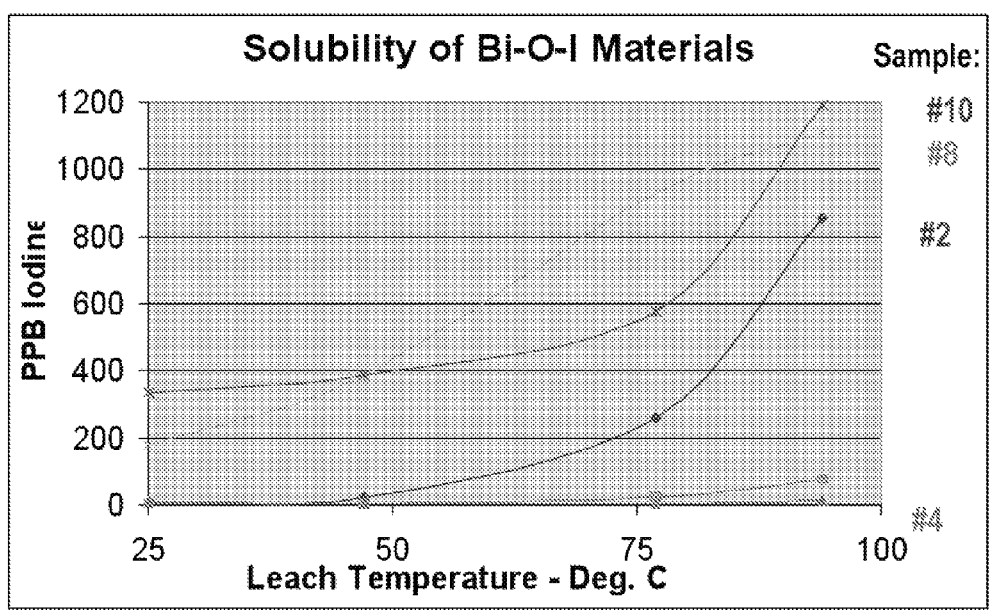
FIG. 10: Iodine-deionized water ("PCT") leach test results for "1-10" series samples (~50 mg of solid in ~50 ml of fluid). Note superior performance of samples #4 and #6.

FIG. 10 shows the amounts of iodine released (leached) from exposure to deionized water for 3 days at various temperatures.

Figure 11:
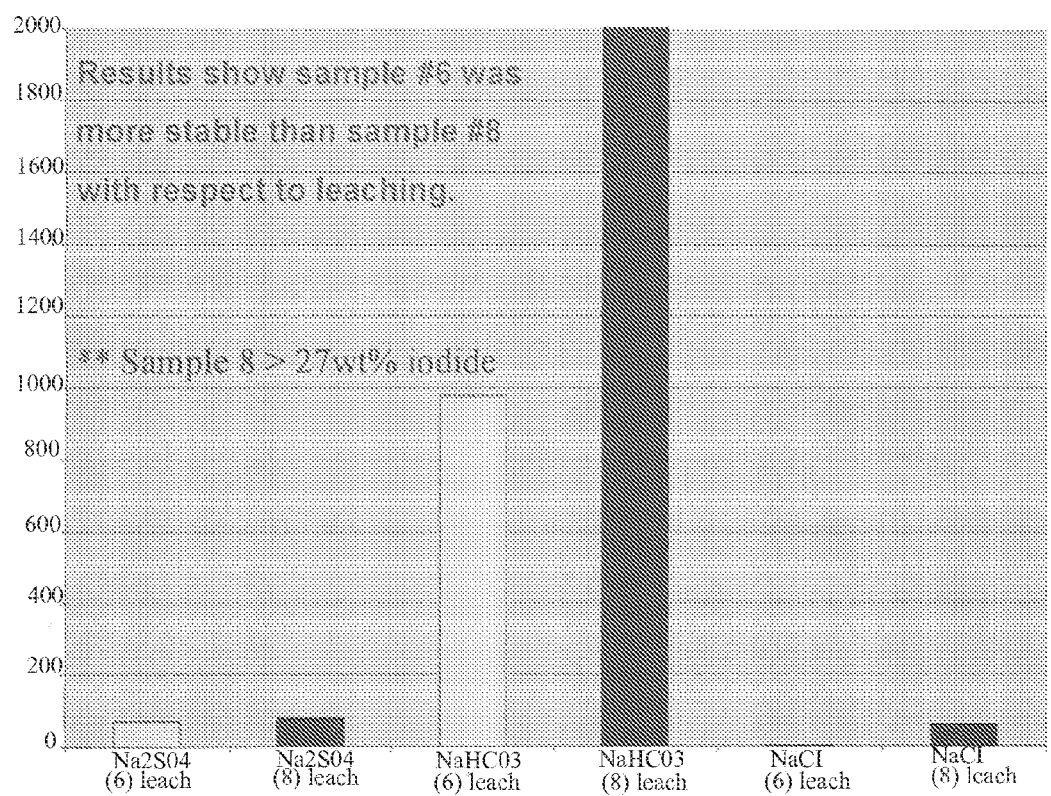
FIG. 11: Contrasting iodine releases in 0.005 molar sodium sulfate, bicarbonate and chloride solutions (0.1-0.2 g of solid in 20 ml of leach fluid).

FIG. 11 shows the amounts of iodine released (leached) from exposure to deionized water for 3 days at various temperatures with 0.005 M of common groundwater anions (i.e., sulfate, carbonate, and chloride) added to the water. It can be seen that sample #6 was more stable than sample #8 with respect to iodine leaching. The presence of carbonate ion ($HCO_3^-$) produced the greatest amount of iodine leaching.

Figure 12:
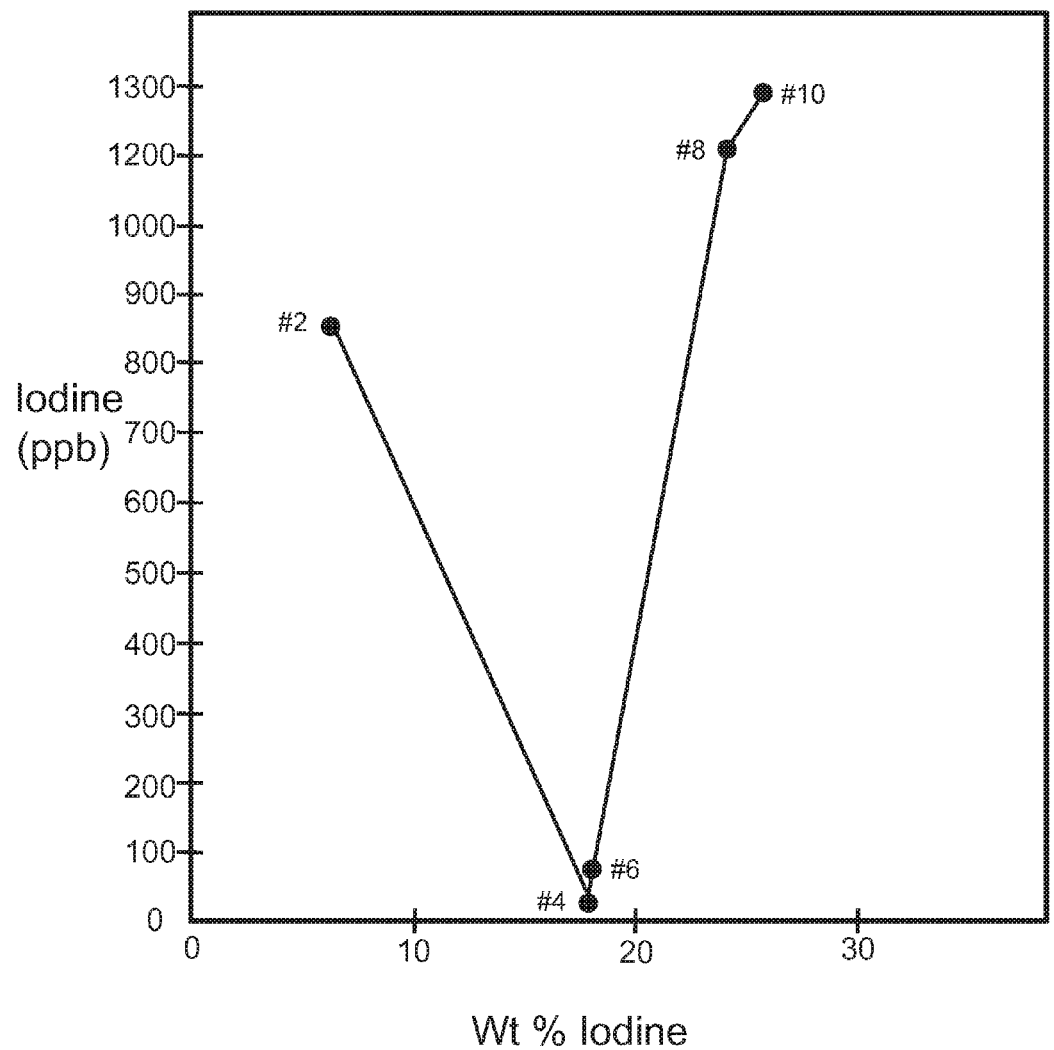
FIG. 12: Solubility of select "1-10" series materials in deionized water at 94° C. as a function of Wt % Iodine in the Sample.

FIG. 12 shows the amounts of iodine released (ppb) for samples 2, 4, 6, 8, and 10 after 3 days exposure to deionized water at 94° C. (see Table 5). One would normally expect there to be a smooth, linear change in solubility as a function of varying composition (wt % iodine), based on a simple rule-of-mixtures behavior, in the samples tested (i.e., there would be a straight line between sample 2 and 10). However, what we unexpectedly found was a strong minimum in the solubility curve at samples 4 and 6 (i.e., at about 18% wt % iodine), where the solubility was reduced a factor of 100× at the minimum, compared to the maximum (for samples 8 and 10).

This was a very unexpected result, and supports our belief that our synthesized mixed-layered Bi—O—I materials are not simple mechanical mixtures of the two known, layered end-member compositions (BiOI, and $Bi_5O_7I$), but, rather, are a much more complex chemical assemblage, intimately-mixed at an atomistic-scale of two or more layered Bi—O—I lattice phases, possibly more, whose structure is much more stable to dissolution by water than either of the two end-member compositions (BiOI, and $Bi_5O_7I$) by themselves.

Figure 13:
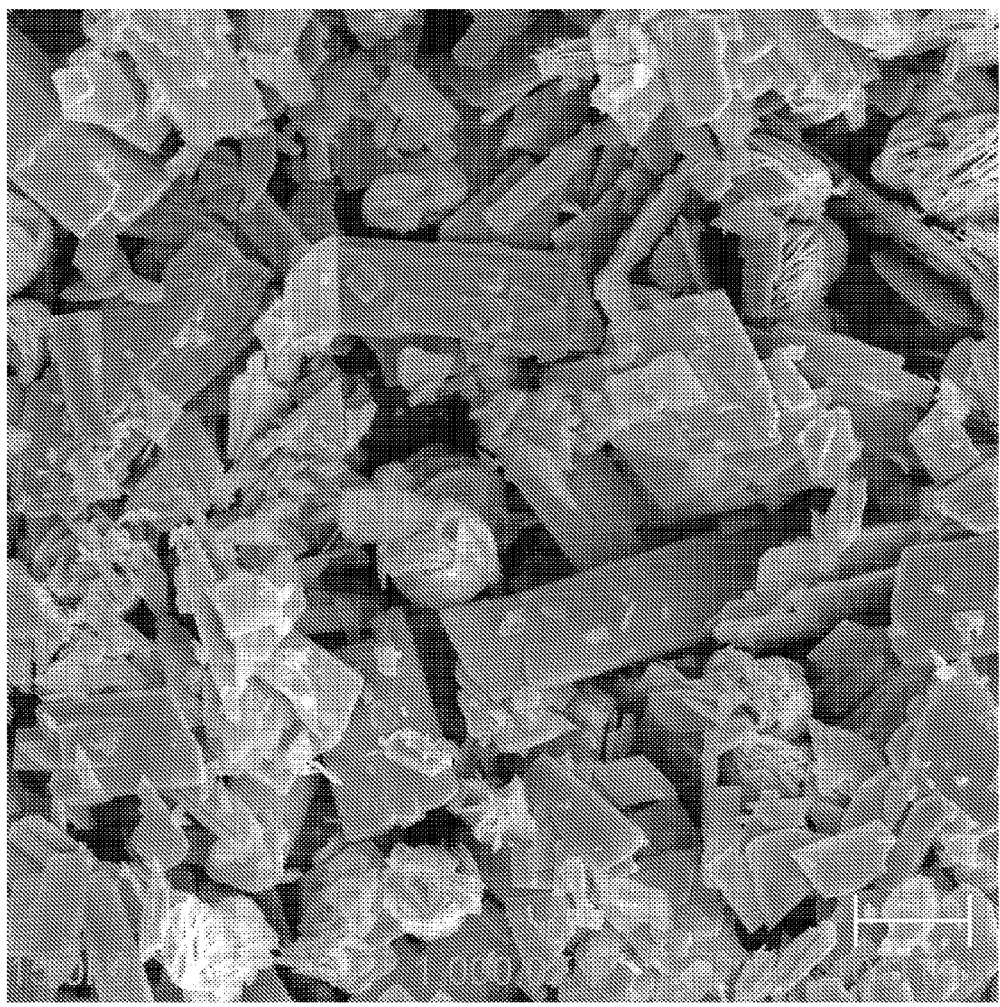
FIG. 13: SEM micrograph of sample #1.
Figure 14:
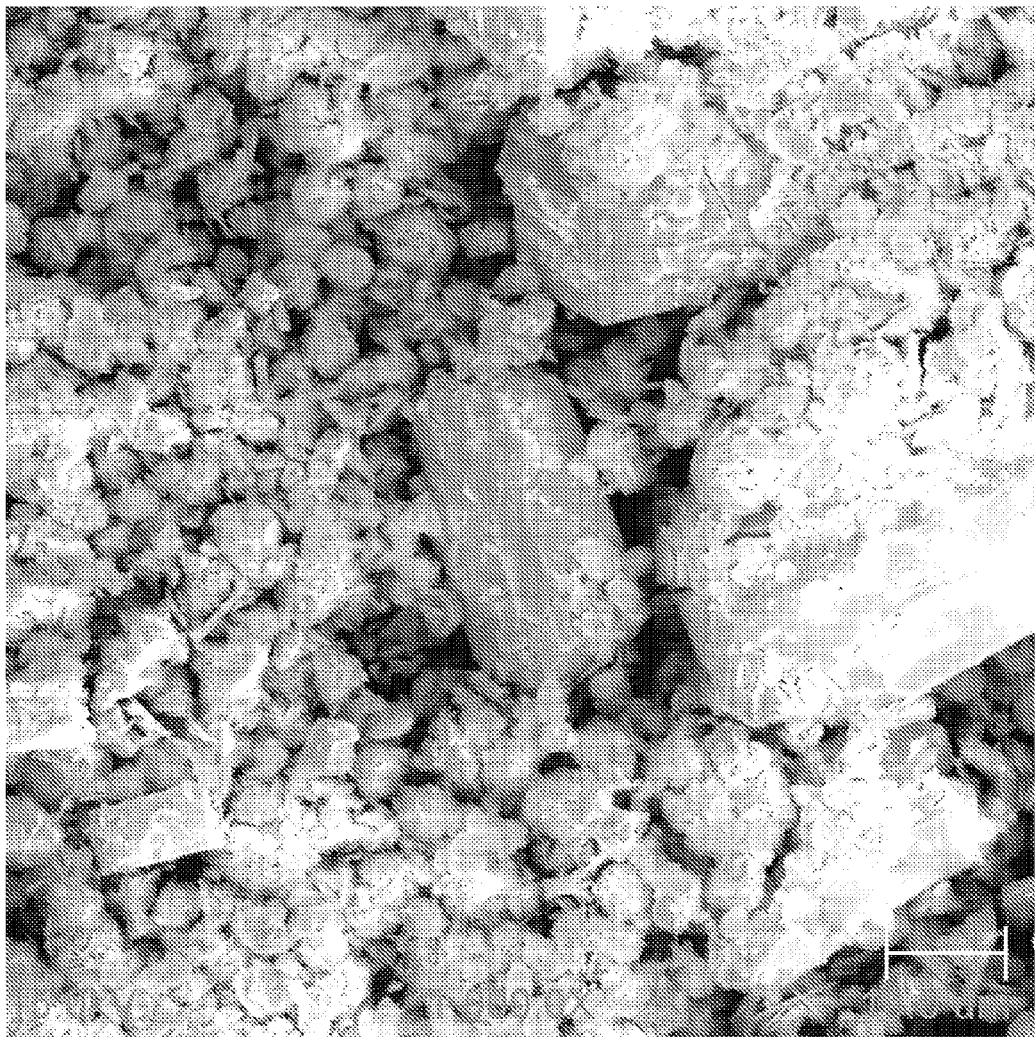
FIG. 14: SEM micrograph of sample #6.
Figure 15:
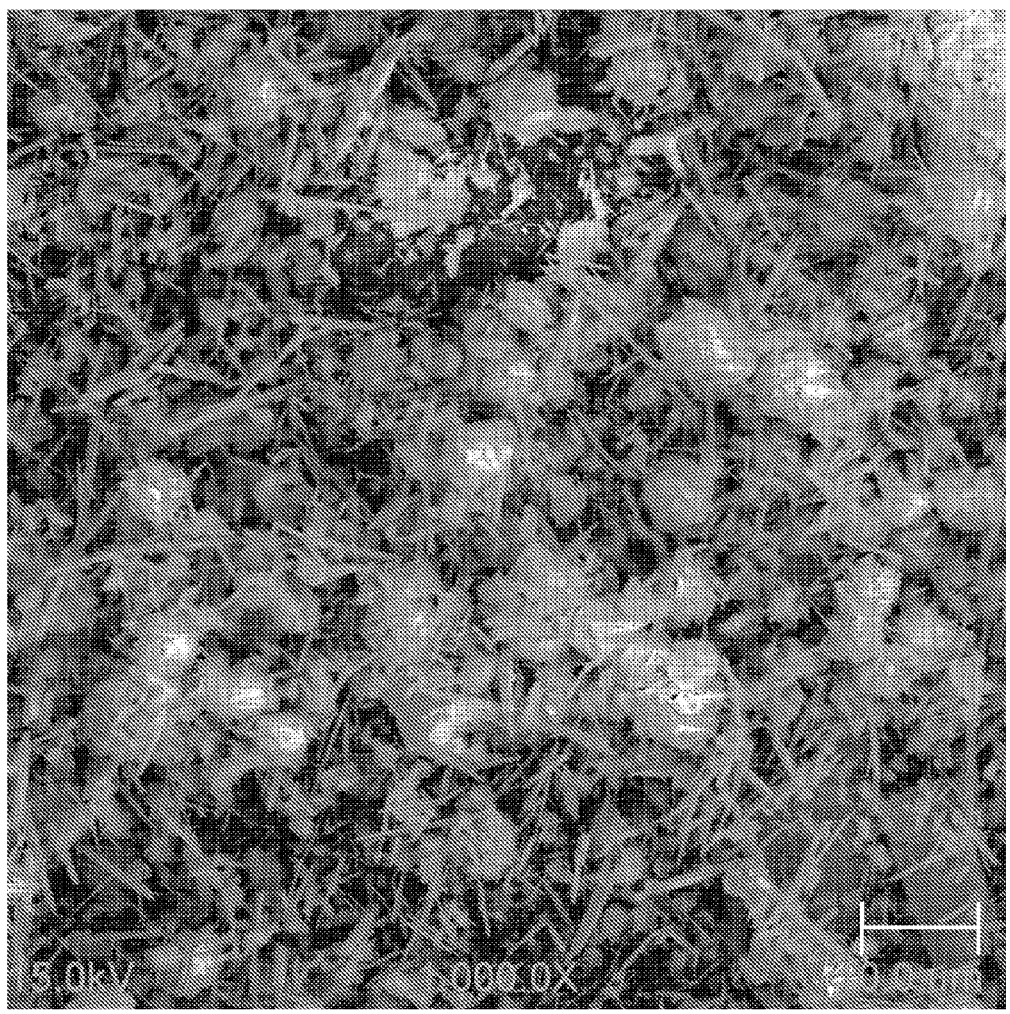
FIG. 15: SEM micrograph of sample #10.

This assessment is further supported by Scanning Electron Microscope (SEM) photomicrographs. FIG. 13 shows a 1000× magnification of sample #1. Long, rectangularly-shaped crystalline blocks can be seen, along with thin plates (flakes) and balls made of flakes ("flakey" balls). FIG. 14 shows a 1000× magnification of sample #6. A few crystalline blocks can be seen, but most of the image shows balls made of thin flakes ("flakey" balls). FIG. 15 shows a 1000× magnification of sample #10. The image shows both balls made of thin flakes ("flakey" balls), and long, thin spikes (needles). Clearly, the microstructure of the three different samples (1, 6 and 10) are vastly different, and are not simple mechanical mixtures of the two known, layered end-member compositions (BiOI, and $Bi_5O_7I$).

The SEM micrographs in FIGS. 13-15 also show that our synthesized mixed-layered Bi—O—I materials have a very high specific surface area (see, e.g., FIG. 13). It is rather remarkable that, despite the high specific surface area microstructure, any of these materials could have a very low solubility in ground water (e.g., the middle series samples 4, 5, & 6).

By using these optimized mixed-layered bismuth oxy-iodine materials, the greatest cost savings can be realized from: (1) the ability to implement this technology into processing wastes from civilian and defense nuclear power cycles and reactors, and by (2) reducing energy consumption plus reduced potential radiological exposure to workers by combined sequestration and waste form materials processing. This process can be applied across the United States and world wide for the removal and storage (for decay) of radioactive iodine compounds. It can be used for both defense and civilian nuclear power cycle productions of iodine gas and iodine aqueous compounds.

With respect to the iodine leaching tests shown in FIG. 11, it can be seen that carbonate is apparently the anion of greatest concern in groundwater (i.e., greatest leaching). This raises the interesting possibility of synthesizing even more stable compounds that deliberately incorporate the same carbonate species along with the iodine to make a mixed-layered bismuth-oxygen-carbonate-iodine material.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A method of synthesizing a mixed-layered bismuth oxy-iodine material, comprising:
   a) forming a mixture by combining and mixing the following ingredients:
      a bismuth salt,
      deionized water,
      $XI$ or $XIO_3$, where X is selected from the group consisting of alkali and alkali earth cations, H, and ammonium; and
      a sufficient amount of a base to adjust the pH of the mixture to an optimal range for forming precipitates with a maximum iodine update;
   b) heating the mixture, thereby precipitating solids and leaving a supernate; and
   c) separating the precipitated solids from the supernate;
   whereby the precipitated solids comprise the mixed-layered bismuth oxy-iodine material; and
   wherein the mixed-layered bismuth oxy-iodine material has between has between 15 mole % and 20 mole % $Bi_5O_7I$ with a remainder corresponding amount of between and 80 mole % and 85 mole % BiOI.

2. The method of claim 1, wherein the mixed-layered bismuth oxy-iodine material has between 17 wt % and 22 wt % iodine.

3. The method of claim 1, wherein X=potassium.

4. The method of claim 1, wherein the mixture is heated to a temperature less than 100° C. for at least 12 hours.

5. The method of claim 1, wherein the bismuth salt is bismuth nitrate or bismuth trichloride.

6. The method of claim 5, wherein the bismuth salt is bismuth nitrate.

7. A method of synthesizing a mixed-layered bismuth oxy-iodine material, comprising:
   a) forming a mixture by combining the following components:
      bismuth nitrate, $Bi(NO_3)_3 \cdot 5H_2O$;
      deionized water;
      potassium iodide;
      NaOH;
   b) heating the mixture, thereby precipitating solids and leaving a supernate;
   c) separating the precipitated solids from the supernate;
   and d) drying the separated solids to produce the mixed-layered bismuth oxy-iodine material; wherein the mixed-layered bismuth oxy-iodine material has between has between 15 mole % and 20 mole % $Bi_5O_7I$ with a remainder corresponding amount of between and 80 mole % and 85 mole % BiOI.

8. The method of claim 7, wherein the mixture is heated at 90° C. for at least 12 hours.

9. The method of claim 7, wherein the potassium iodide contains $^{129}I$.

10. A method of capturing and immobilizing radioactive isotopes of iodine, the method comprising:
    a) providing a caustic waste stream comprising XOH and the radioactive isotopes of iodine in the form of YI or $YIO_3$, where X and Y are selected from the group consisting of alkali and alkali earth cations, H, and ammonium, and where X can be the same, or different, than Y;
    b) adding a bismuth salt and an acid to the caustic waste stream, then mixing;
    c) heating the stream of step b), whereby a precipitate forms and leaves a supernate;
    d) separating the precipitated solids from the supernate; and
    wherein the precipitated solids comprise a mixed-layered bismuth oxy-radioiodine material containing the radioactive isotopes of iodine; and
    wherein the mixed-layered bismuth oxy-iodine material has between has between 15 mole % and 20 mole % $Bi_5O_7I$ with a remainder corresponding amount of between and 80 mole % and 85 mole % BiOI.

11. The method of claim 10, wherein the radioactive isotopes of iodine are one or both $^{129}I$ and $^{131}I$.

12. The method of claim 10, wherein X and Y are both potassium.

13. The method of claim 10, wherein X is sodium and Y is potassium.

14. The method of claim 10, wherein the bismuth salt comprises bismuth nitrate or bismuth trichloride.

15. The method of claim 10, wherein the acid comprises nitric acid.

16. The method of claim 10, further comprising adjusting the pH of the caustic waste stream so that the supernate has a pH from 4.7 to 6.5 after heating.

17. The method of claim 10, wherein the mixed-layered bismuth oxy-radioiodine material has an elemental composition comprising 17-22 wt % iodine, with the balance comprising bismuth and oxygen.

18. The method of claim 10, wherein the mixed-layered bismuth oxy-radioiodine material has a bismuth-to-iodine molar ratio between 1.64 and 2.13.

19. A mixed-layered bismuth oxy-iodine material, made by performing the process of claim 10.

* * * * *